(12) United States Patent
Kubli et al.

(10) Patent No.: US 11,914,926 B2
(45) Date of Patent: Feb. 27, 2024

(54) METHOD FOR DESIGNING A WEB THAT LINKS PARTS TO A CARRIER BEING PROCESSED IN A PROGRESSIVE DIE

(71) Applicant: AutoForm Engineering GmbH, Wilen b. Wollerau (CH)

(72) Inventors: Waldemar Kubli, Neerach (CH); Matthias Pietsch, Zürich (CH); Maria Rasmussen, Zürich (CH); Marcus Kahler, Thalwil (CH)

(73) Assignee: AutoForm Engineering Gmbh, Wilen b. Wollerau (CH)

( * ) Notice: Subject to any disclaimer, the term of this patent is extended or adjusted under 35 U.S.C. 154(b) by 1114 days.

(21) Appl. No.: 15/929,165

(22) Filed: Nov. 14, 2019

(65) Prior Publication Data
US 2020/0159869 A1    May 21, 2020

(30) Foreign Application Priority Data
Nov. 15, 2018   (CH) ...................... 01420/18

(51) Int. Cl.
*G06F 30/00*   (2020.01)
*G06F 113/24*  (2020.01)

(52) U.S. Cl.
CPC .......... *G06F 30/00* (2020.01); *G06F 2113/24* (2020.01)

(58) Field of Classification Search
CPC ...... G06F 30/00; G06F 2113/24; G06F 30/20; G06F 30/17
See application file for complete search history.

(56) References Cited

U.S. PATENT DOCUMENTS

2003/0125825 A1*   7/2003   Liu .................... G05B 19/4097
                                                                700/206
2008/0243442 A1*  10/2008   Kubli ............... G05B 19/40937
                                                                703/1

OTHER PUBLICATIONS

Lin, Alan C., Ho Minh Tuan, and Dean K. Sheu. "Programming for evaluating strip layout of progressive dies." In 2011 Sixth International Conference on Digital Information Management, pp. 229-234. IEEE, 2011. (Year: 2011).*

Wang, Zhen, Qiuchong Zhang, Yuqi Liu, and Zhibing Zhang. "A robust and accurate geometric model for automated design of drawbeads in sheet metal forming." Computer-Aided Design 92 (2017): 42-57. (Year: 2017).*

(Continued)

*Primary Examiner* — Eunhee Kim
(74) *Attorney, Agent, or Firm* — Oppedahl Patent Law Firm LLC

(57) ABSTRACT

A computer implemented method for designing a web (4) linking parts (3) to a carrier (2) in a sheet metal strip (1) that is processed in a progressive die process, comprises the steps of
  processing input actions from a user, the input actions specifying parameters of web primitive elements, the web primitive elements comprising at least connections (5), each connection (5) representing a link between sheet metal sections;
  the user input actions specifying, for each connection (5), a first connection point (13), at which the connection (5) is joined to a first sheet metal section, and a second connection point (13), at which the connection (5) is joined to a second sheet metal section;
the method allowing for a user input of a deformability parameter associated with a connection (5), for modifying a spring constant of the connection (5) in a direction between the first and second connection points (13).

20 Claims, 6 Drawing Sheets

(56) References Cited

OTHER PUBLICATIONS

V. Naranje, S. Kumar, A knowledge based system for automated design of deep drawing die for axisymmetric parts, Expert Systems with Applications, vol. 41, Issue 4, Part 1, 2014, pp. 1419-1431, ISSN 0957-4174. (Year: 2014).*
Prasad et alia: "CADDS: an automated die design system for sheet-metal blanking", Computing & Control Engineering Journal, Jul. 1992, pp. 185-191.
Michael Koreli: "Designing progressive dies", Stamping Journal, Sep. 17, 2001, pp. 1-12.
Li Xiaoda et alia: "Study on the Rapid Progressive Die Design of Sheet Metal with Free Form Surface", Advanced Materials Research, vols. 328-330, Sep. 2, 2011, pp. 828-831.

* cited by examiner

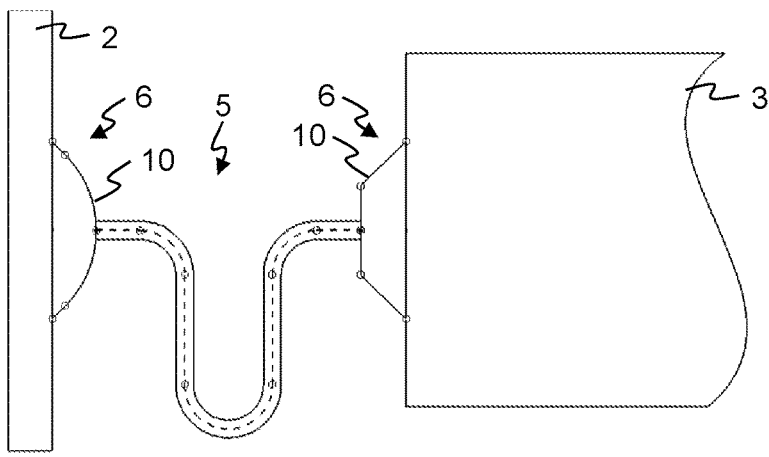
Fig. 3
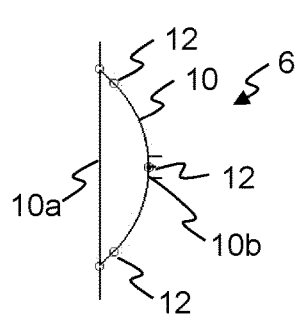 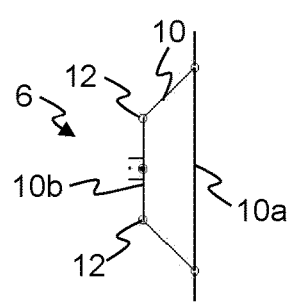 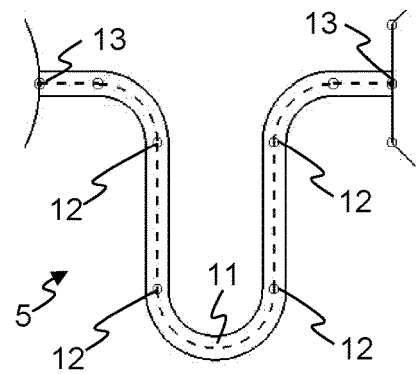
Fig. 4   Fig. 5   Fig. 6
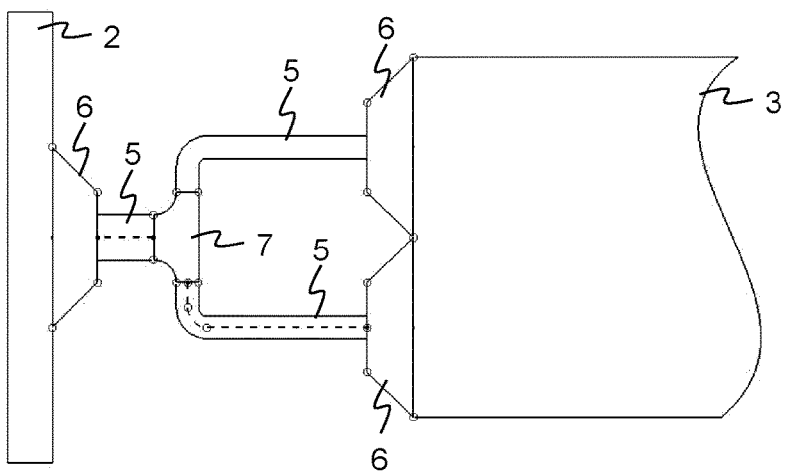
Fig. 7
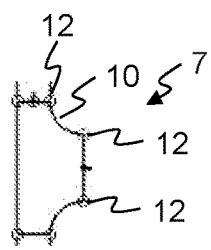 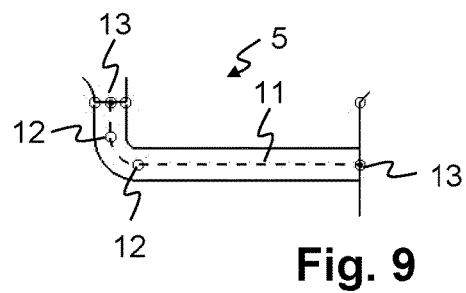 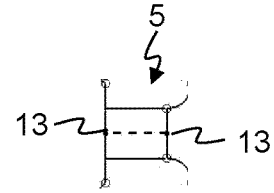
Fig. 8   Fig. 9   Fig. 10

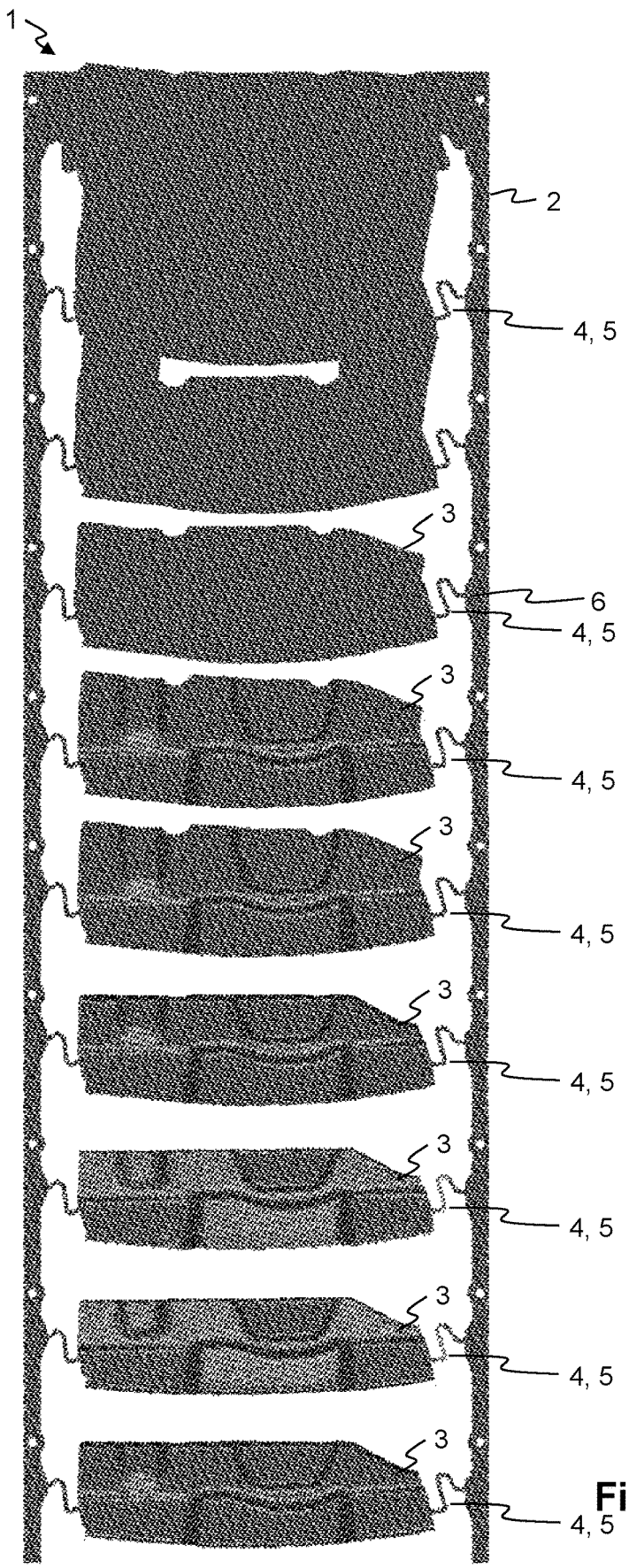
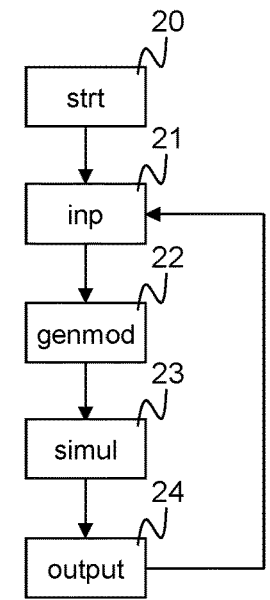
Fig. 31
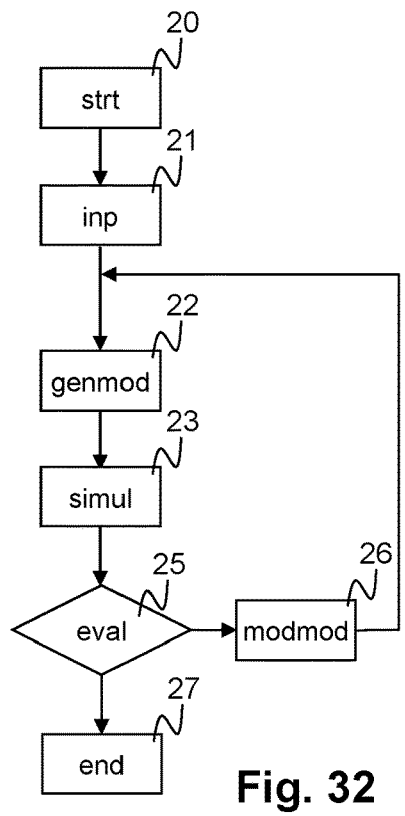
Fig. 30
Fig. 32

METHOD FOR DESIGNING A WEB THAT LINKS PARTS TO A CARRIER BEING PROCESSED IN A PROGRESSIVE DIE

BACKGROUND

The invention relates to the field of computer implemented designing and manufacturing sheet metal parts. In particular, it relates to a method for designing a web that links parts to a carrier being processed in a progressive die or in a sequence of stations in progressive presses as described in the preamble of the corresponding independent claims.

Progressive stamping is a metalworking method that can encompass punching, bending, deep-drawing, cutting and other ways of modifying metal raw material, in particular sheet metal, combined with an automatic feeding system. The feeding system pushes a strip of metal through a sequence of operation stations of a progressive stamping die or a sequence of separate forming presses. Each station performs one or more operations until a finished part is made. The parts are supported by the web, the web being of the same material as the parts. After separating the parts from the web, the latter is discarded as scrap material. The web forms a compliant structure for holding, transporting and positioning the parts in the tools of the operation stations. The web in turn can be transported and positioned by means of carriers. Carriers comprise one or more typically two or three, sections of the strip of metal, extending along its length.

Here and in the remainder of this document, the term "progressive die" is understood to cover a process in which process operations take place in a single die, but also a process where separate dies in separate operating stations are present, and the sheet metal is transported from one operating station to the next, typically remaining attached to the carrier.

The web is commonly designed manually, in a CAD system or with a dedicated software, using a graphic user interface with which a user can select elements for linking a part to a carrier, and input geometric parameters of these elements. However, once a web is defined in this manner, it may become apparent in a real or simulated production run, that problems arise. For example, the web may have to accommodate a certain amount of movement of the part during a stamping operation. For this, elements of the web can be designed to be resilient. The resilience must be adapted to the various operations to which the part is subjected in the different stages in the progressive die. On the one hand, the web must be stiff enough to avoid oscillations of the part, on the other hand, it may not restrain movement of the part too much when the part is being operated on. For example, if a region of the sheet metal at which the web is attached to the part is subject to a large displacement, the web can be damaged or torn. Or the web can restrain movement of the part too much, and consequently the part can be damaged or the forming operation can be compromised. This is particularly the case when deep drawing or folding operations take place on the part, which can necessitate relatively large displacements of the edge of the part. Given such problems, it is necessary to adapt the geometry of the web and repeat the simulation of the manufacturing process, or its execution in reality. Adapting the geometry of the web is tedious, since the geometry of the web is generally complex and involves a large number of parameters defining the geometry.

CAD systems that support the manual creation of sheet metal dies are described in Y. Prasad et al.: CADDS: an automated die design system for sheet-metal blanking, Computing & Control Engineering Journal, Jun. 1, 1992 (1992-06-01), Pages 185-191; and Michael Koreli: Designing progressive dies. Stamping Journal January/February 1999.

It is therefore an object of the invention to create a method for designing a web linking parts to a carrier in a sheet metal strip that is processed in a progressive die manufacturing process of the type mentioned initially, which allows to define the web in a manner that is easy to specify and to modify in view of problems that arise when performing or simulating the manufacturing process.

SUMMARY OF THE INVENTION

These objects are achieved by the method according to the claims.

The computer implemented method for designing a web linking parts to a carrier in a sheet metal strip that is processed in a progressive die process, comprises the steps of processing input actions from a user, the input actions specifying parameters of web primitive elements, the web primitive elements comprising at least connections, each connection representing a link between sheet metal sections;

the user input actions specifying, for each connection, a first connection point, at which the connection is joined to a first sheet metal section, and a second connection point, at which the connection is joined to a second sheet metal section;

the method allowing for a user input of a deformability parameter associated with a connection, for modifying a spring constant of the connection in a direction between the first and second connection points.

In embodiments, sheet metal sections linked by a connection are one or more of the parts themselves, the carrier itself, boundary nodes that are joined to the parts or to the carrier, respectively, or island nodes that are joined only to connections.

The link between the part and the carrier can be a direct link, in which one end of the link is attached to the part and the other one to the carrier. Alternatively, it can be an indirect link, in which either one end or both ends of the indirect link are attached to the part or the carrier, respectively, via other links.

The spring constant expresses a stiffness, or inversely an elasticity, of a connection. Typically, the spring constant in the direction between the first and second connection points is a spring constant that relates forces acting at the connection points in that direction to relative displacements of the connection points in that direction.

There can be connections that do not have an associated deformability parameter. For each connection that does have an associated deformability parameter, this parameter typically is different from that of other connections, and can be modified separately.

In embodiments, the deformability parameter affects the shape of its associated connection along at least a third of the length of the connection, measured along a centre curve of the connection.

The deformability parameter can affect the shape of its associated connection as a whole, and not only a detail of the shape. Affecting the shape as a whole can mean that the shape of the connection is affected by the deformability parameter along at least a third of the length of the connection, measured along a centre curve of the connection.

In embodiments, the shape of the connection is represented by a centre curve of the connection, the curve having a length, and wherein the deformability parameter modifies the length of the center curve.

The center curve can be defined as following midpoints between the two opposite outlines that extend between the two sheet metal sections joined by the connection. The length of the connection can be defined as the length of the center curve, as measured by following the center curve from the first connection point to the second connection point.

In embodiments, the shape of the connection is represented by a centre curve of the connection, and the centre curve, at least in some sections of the connection, deviates from a connection axis, the connection axis being a straight line between the first and second connection points, and the deformability parameter modifies, for two or more points of the centre curve, a distance between each of these points and the connection axis.

In this way, the deformability parameter can be used to control an extent to which the connection extends away from the connection axis. In other words, the connection can be stretched in a direction that is at an angle to the connection axis. This directly affects the deformability of the connection: the more the connection is extended or stretched in this way, the more it becomes elastic in the direction of the connection axis. In this manner, a single parameter, the deformability parameter, can be used to modify the entire shape of the connection. The modification is linked to the deformability of the connection in an intuitively clear and simple way.

In embodiments, the centre curve is defined by a sequence of control points, and the deformability parameter modifies the distance of two or more of these control points, called "affected control points", from the connection axis.

In embodiments, the control points define the centre curve by joining them with a sequence of straight lines and arcs. For this, the shape of the connection typically can be manually defined by combining straight and arc segments, or by retrieving a combination from a library of connection shapes. Control points can define the beginning and end of segments. In other embodiments, the control points define the centre curve by means of spline curves or Bézier curves. Regardless of the manner in which the control points define the centre curve, modifying the location of a control point then modifies the shape of segments or curve regions defined by the control points. Thus, by moving control points away from or towards the connection axis, the shape of the connection is modified.

In embodiments, the affected control points are all the control points that do not lie on the connection axis.

In embodiments, a change of the deformability parameter causes, for each affected control point, a change of the control point's distance from the connection axis according to a monotonous function, and in particular the same proportional change of its distance from the connection axis.

In other words, for all the affected control points, their distance from the connection axis increases or decreases monotonously, or, alternatively, strictly monotonously, according to the deformability parameter. Corresponding monotonous functions can be different for each control point or can be the same for all control points. In embodiments, the functions are proportional functions. In embodiments, a proportionality factor is the same for all control points, that is, their distances change by the same multiplicative factor. This factor can be the deformability parameter itself, or can be derived from the deformability parameter.

In embodiments, a change of the deformability parameter causes a displacement of the affected control points in a variation direction, the variation direction being the same for all the affected control points.

In embodiments, the variation direction lies at an angle, called "variation angle", to the connection axis, and wherein the variation angle is controllable by a user input.

Typically, the variation angle is by default a right angle. Modifying the variation angle allows the user to control in which direction the connection stretches. In this way, collision of the modified connection with other sheet metal regions, such as parts and/or the carrier can be avoided. Furthermore, the deformability in directions differing from the connection axis can be modified.

In embodiments, the web primitive elements specified by the user comprise in addition to connections, at least one or more of boundary nodes, which are configured to be joined, at one side, to a part or to the carrier, and to be joined at another, typically opposite, side to a connection;
island nodes, which are configured to be joined only to connections, in particular to at least three connections;
cut-outs, which are configured to be placed in the carrier or in island nodes, representing holes.

Boundary nodes thus serve for attaching connections to parts or the carrier. Island nodes allow to join three or more connections, thereby creating webs with branching structures. Cut-outs allow to specify holes for transporting and positioning the web as it progresses stepwise through the press or presses. The use of these four web primitive elements, that is, connections, boundary nodes, island nodes, and cut-outs, allows for a versatile and efficient design of the web that is, on the one hand, versatile and flexible enough for designing a web, and on the other hand, simple enough to be useable.

Based on the four web primitive elements, combinations representing more complex web structures can be defined. In embodiments, such combinations or complex web structures are stored in a library and can be retrieved by a user.

In embodiments, the method comprises the steps of processing a user input specifying a value for a deformability parameter, and automatically setting the deformability parameters of two or more connections to that value, wherein these two or more connections are part of the web that links one part to the carrier.

Setting the deformability parameters of two or more connections in single user interaction allows to control the deformability of a subset of connections of the web in an easier manner than having to set the deformability parameter for each connection individually.

These two or more connections can part of a complex web structure that links the part to the web through a set of sequential and/or parallel connections. Sequential connections are present, when a path from the carrier to the part passes through two connections, joined, for example by an island node. Parallel connections are present, for example, when two separate paths exist between the carrier and a particular part, or between an island node and a part, or an island node and the carrier.

In embodiments, the method comprises the steps of
a) automatically generating, based at least on the web primitive elements specified by the user and on a model of the part, a simulation model of the combined web and part;

b) simulating, by means of a forming process simulation, a sequence of forming processes for forming the parts, thereby also simulating forces and displacements acting on the web;
c) determining values of one of more objective functions based on results of the forming process simulation;
d) manually or automatically adapting one or more deformability parameters according to the values of the one or more objective functions;
e) iteratively repeating the above steps a) through d).

This allows to adapt deformability parameters until a certain quality of the forming process and the part, expressed e.g. by the objective function, is reached. The resulting deformability parameters can be called optimised deformability parameters.

For the step of simulating, a given model of the geometry of the tools, that is, punch and die, and optionally a binder, can be generated manually and/or automatically from the geometry of the parts and the web. Forming operations such as cutting, deep drawing, bending and flanging etc. can be simulated with known methods and tools for sheet metal forming simulation.

In embodiments, the method comprises the step of manufacturing tools constituting the progressive die and for cutting the web as specified, among others, by the optimised deformability parameter.

In embodiments, the method comprises the step of performing the forming process with the web as specified, among others, by the optimised deformability parameter.

In embodiments, the method comprises the steps of, in step d), in addition or alternatively to adapting deformability parameters, adapting at least one of
locations of connection points at which connections are linked to parts or the carrier, and
locations of boundary nodes via which connections are linked to parts or the carrier.

In embodiments, the method comprises the step of, in step d), in addition or alternatively to adapting deformability parameters, adapting the location of island nodes.

A data processing system for designing a web linking parts to a carrier in a sheet metal strip that is processed in a progressive die process, is programmed to perform the method described herein.

A Computer program for designing a web linking parts to a carrier in a sheet metal strip 1 that is processed in a progressive die process, is loadable and executable on a data processing unit and which computer program, when being executed performs the method described herein.

A non-transitory computer readable medium comprising computer readable program code encoding a computer program that, when loaded and executed on a computer, causes the computer to perform the method described herein.

A Method of manufacturing a non-transitory computer readable medium, comprises the step of storing, on the computer readable medium, computer-executable instructions which when executed by a processor of a computing system, cause the computing system to perform the method described herein.

In an embodiment, a computer program product or a computer program for designing a web that links parts to a carrier being processed in a progressive die is loadable into an internal memory of a digital computer or a computer system, and comprises computer-executable instructions to cause one or more processors of the computer or computer system execute the method. In another embodiment, the computer program product comprises a computer readable medium having the computer-executable instructions recorded thereon. The computer readable medium preferably is non-transitory; that is, tangible. In still another embodiment, the computer program is embodied as a reproducible computer-readable signal, and thus can be transmitted in the form of such a signal.

Further embodiments are evident from the dependent patent claims.

DESCRIPTION OF THE DRAWING

The subject matter of the invention will be explained in more detail in the following text with reference to exemplary embodiments which are illustrated in the attached drawing in several figures, which schematically show:

FIGS. 3-6—details related to a connection that links a part to the carrier;

FIGS. 7-10—details related to a combination of connections that includes branches;

FIG. 30—a sheet metal strip with parts in different states of processing by progressive stamping or forming; and FIGS. 31-32—flow diagrams of embodiments of the method.

In principle, identical or functionally similar elements are provided with the same reference symbols in the figures.

DETAILED DESCRIPTION

Figure 1:
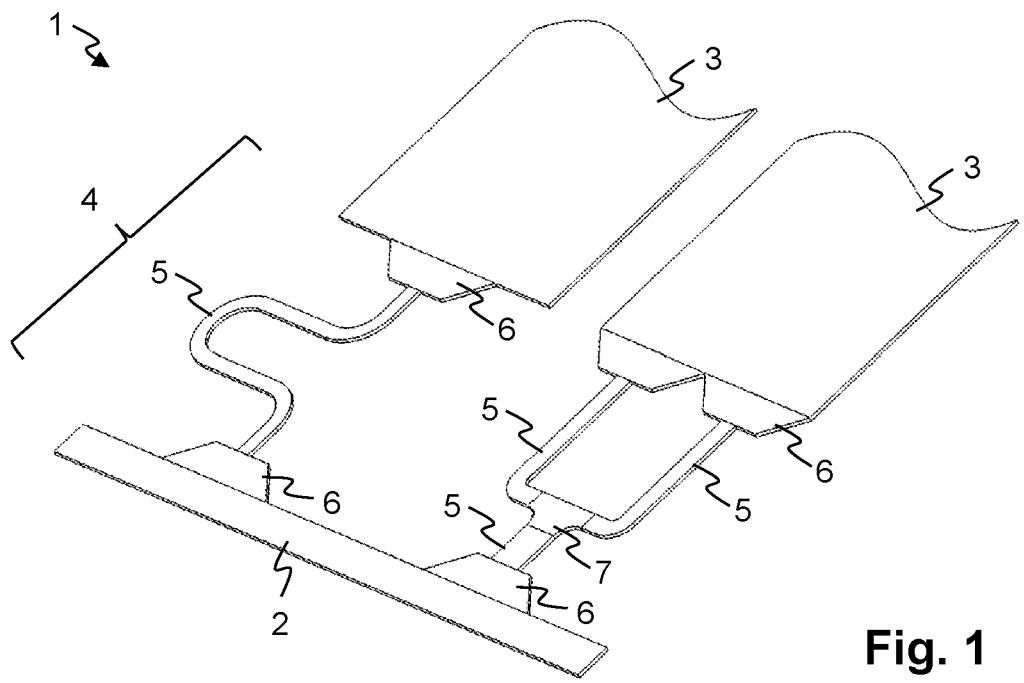
FIG. 1—a section of a sheet metal strip with parts, a carrier, and various elements of the web that link the parts to the carrier.

FIG. 1 shows a section of a sheet metal strip 1 with parts 3, a carrier 2, and various elements of a web 4 that link the parts 3 to the carrier 2. These elements comprise at least, for each part 3, one or more connections 5 linking the part 3 to the carrier 2. At a location where a connection 5 is attached to the part 3 or the carrier 2, respectively, a boundary region or boundary node 6 can be present. A boundary node 6 is a region of the sheet metal that is added to the part 3 or carrier 2, respectively, and serves as an attachment region for the connection 5. The boundary node 6 or region typically has broad base 10*a*, wider than a width of the connection 5, where it is joined to the carrier 2. It has a narrower connector side 10*b*, typically at least as wide as the width of the connection 5, where it is joined to the connection 5. Between the base 10*a*, and the connector side 10*b*, the width of the boundary node 6 gradually decreases. In this way, an even distribution of forces in the part 3 and web 4 can be realised, and extreme forces that could damage the part 3 or web 4 can be prevented.

In the left part of FIG. 1, a single connection 5 is shown linking a part 3 to the carrier 2. In the right part, a combination of connections 5 is shown in an arrangement comprising branches. For this, an island node 7 is present, to which three or more connections 5 can be joined.

Figure 2:
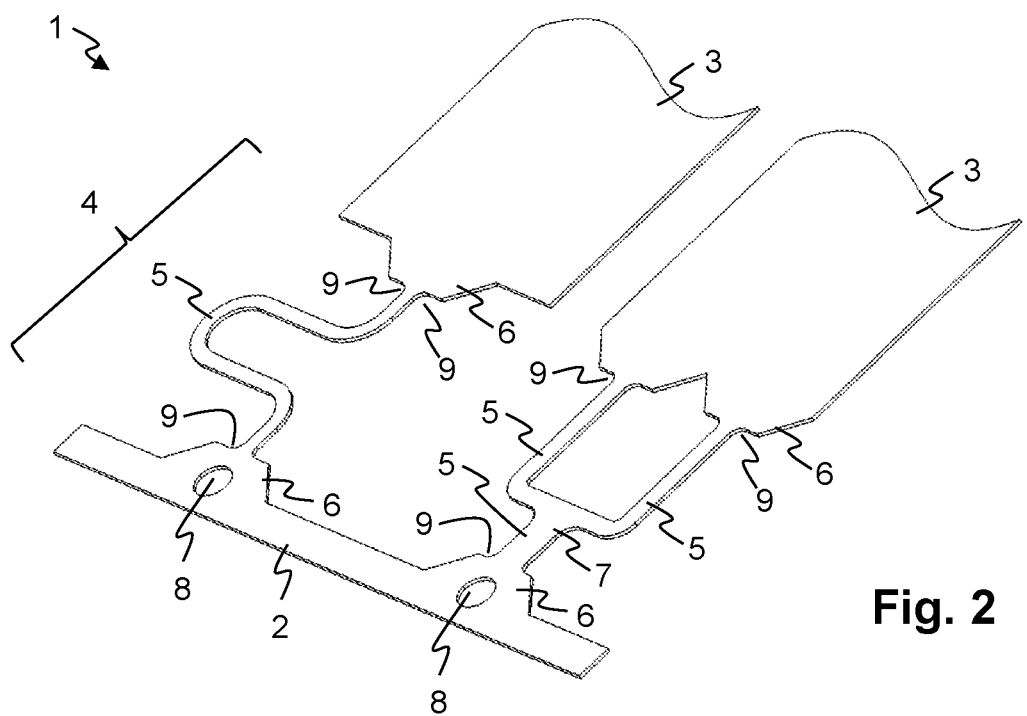
FIG. 2—the same, but showing fillets and cutouts, and with lines removed that delimit the elements from each other and are not present on the real sheet metal strip.

FIG. 2 shows the same arrangement of elements as FIG. 1, but with lines removed that delimit the elements from each other and are not present on the real sheet metal strip 1. In addition to the elements already presented, cutouts 8 or holes are shown. Furthermore, where the connections 5 are joined to boundary nodes 6 or island nodes 7, transitions—typically interior corners—can be rounded or chamfered. This reduces stress concentration near the corners. A rounded transition can be called a fillet 9.

The cutouts 8 can be placed at boundary nodes 6, and boundary nodes 6 can be placed to accommodate cutouts 8, for example, by creating a region in which the carrier 2 is wider. This can be done at regular intervals along the carrier 2. The cutouts 8 can also be present in island nodes 7. Cutouts 8 are typically used for transporting and positioning the sheet metal strip 1, serving as pilot holes. Usually, the carrier 2 runs along a sequence of parts 3 through all steps of the progressive stamping process until the parts 3 are cut free. In some applications, the carrier can be cut in the course of the process, but still be used for transporting and positioning one or more parts 3 attached to the carrier 2.

FIGS. 1 and 2 show only part of the sheet metal strip 1, in that only a single strip of the carrier 2 is shown, and the parts 3 only in part. Typically the carrier 2 comprises, as shown in FIG. 30 one or more additional strips running along the length of the sheet metal strip 1, supporting the web 4 and parts 3.

The elements of the web 4 that are presented herein, that is, the connections 5, boundary nodes 6, island nodes 7 and cutouts 8, are conceptual elements. They are used and manipulated in a computer based design method. During this design process, the elements can be shown as separate elements, and lines separating the elements can be displayed. In the resulting real metal sheet such lines are not visible, as in FIG. 2.

FIG. 3 shows details related to a connection 5 that links a part 3 to the carrier 2, and boundary nodes 6 at which the connection 5 is attached to the carrier 2 and part 3, respectively. FIGS. 4 and 5 show possible embodiments of boundary nodes 6, each boundary node 6 having a base 10*a*, and a connector side 10*b* as already presented. The shape of the connector side 10*b* is defined by boundary curve 10, which in turn is defined by control points 12. In the boundary node 6 of FIG. 4, the boundary curve 10 is curved and the control points 12 define, for example, a spline. Alternatively, the control points 12 can define arcs of a circle. In the boundary node 6 of FIG. 5, the boundary curve 10 is a polygon, whose vertices are the control points 12. FIG. 6 shows a U-shaped connection 5 defined by the trajectory of a centre curve 11, which in turn is defined by control points 12. An outline of the connection 5 can be generated by letting the outline have a width and follow the centre curve 11. As a result, the center curve 11 lies in the middle between the two opposite outlines of the connection 5. The width of the connection 5 can be constant, or it can change (not shown) from a start width w1 at one end to an end width w2 at the other, opposite end. The width and the start and end width can be parameters that are controlled by user input. At one end, at a first connection point 13, the connection 5 is joined to a first sheet metal section, which in this case is a boundary node 6 attaching the connection 5 to the carrier 2. At the other end, at a second connection point 13, the connection 5 is joined to a second sheet metal section, in this case a boundary node 6 attaching the connection 5 to the part 3.

FIG. 7 shows details related to a combination of connections 5 that includes branches. In addition to connections 5 and boundary nodes 6 as already presented, an island node 7 is present, to which in this case three connections 5 are joined, resulting in a branched structure. FIG. 8 shows an island node 7 with a boundary curve 10 defined by control points 12. As for the boundary nodes 6, the boundary curve 10 can be defined in further ways, not illustrated here. FIG. 9 shows a J-shaped connection 5. It has a constant width and follows a centre curve 11. As in the other cases, the centre curve 11 links a first and second connection point 13, its shape being controlled by control points 12. FIG. 10 shows a connection 5 linking its connection points 13 along a straight line, without control points 12.

Based on the web primitive elements, that is, connections 5, island nodes 7 and optionally boundary nodes 6 and cut-outs 8, arbitrary geometries, i.e. shapes of a web 4 can be defined.

The selection of the web primitive elements, how they are shaped and where they are joined to one another, e.g. at connection points 13, can be done by user input actions specifying their attributes or parameters and/or by retrieving stored information, regarding such attributes or parameters, that defines web primitive elements or a combination thereof. Parameters controlled by user input can be set through graphic manipulation of corresponding graphic elements, and/or by entering values in text boxes. Parameters controlled by user input can have stored default values.

Figure 11:
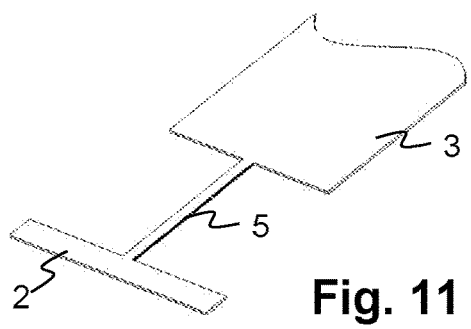
FIG. 11—a connection with a small deformability, or large spring constant, in the direction of the connection.
Figure 12:
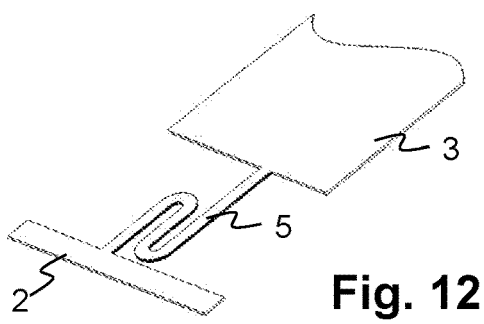
FIGS. 12-14—examples of connections with relatively high deformability, or smaller spring constants in the direction of the respective connection.
Figure 13:
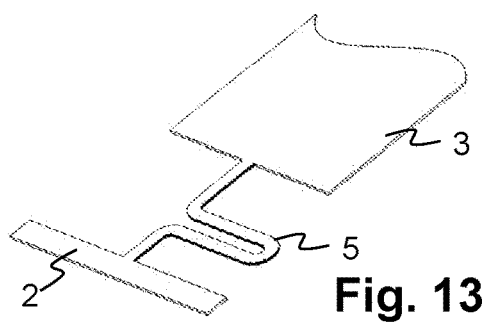
Figure 14:
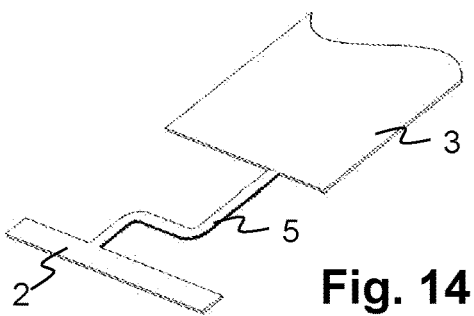

FIGS. 11 to 14 show linear connections 5. FIG. 11 shows a connection 5 with a straight linear connection between the carrier 2 and part 3, having a small deformability, or large spring constant, or high stiffness in the direction of the connection. FIG. 12 shows a S-shaped connection 5. FIG. 13 shows a U-shaped connection 5. FIG. 14 shows a L-shaped connection 5.

Figure 15:
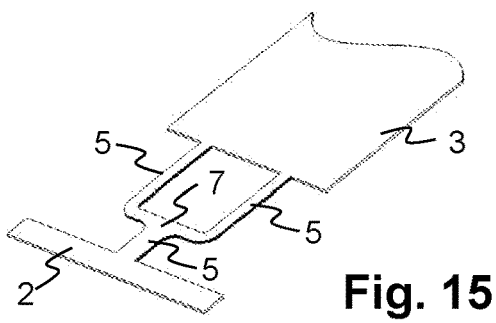
FIGS. 15-17—examples of combinations of connections including branches.
Figure 16:
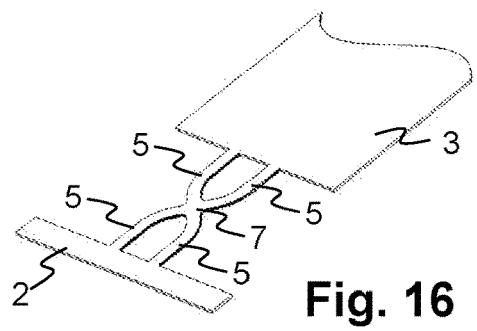
Figure 17:
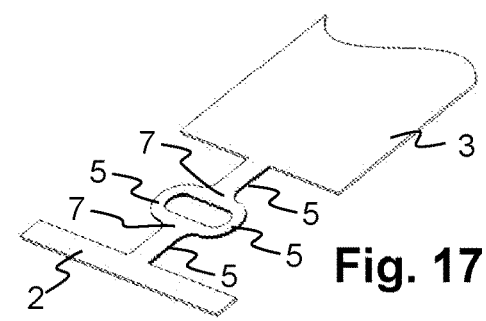

FIGS. 15 to 17 show branched structures composed of or defined by combinations of connections 5 and island nodes 7. FIG. 15 shows a Y-shaped, FIG. 16 an X-shaped, and FIG. 17 an O-shaped structure.

Figure 18:
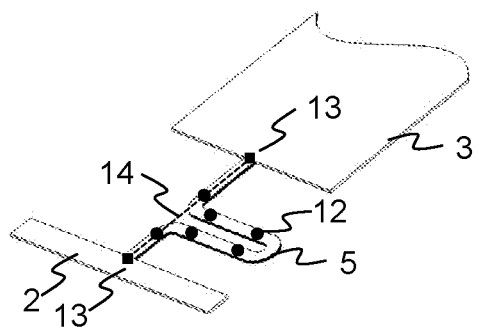
FIGS. 18-21—illustrations of parameters defining a connection.
Figure 19:
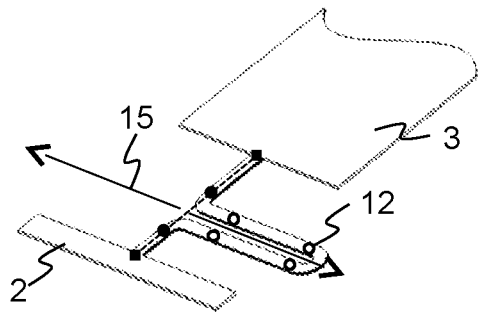

FIGS. 18-21 illustrate different parameters defining a connection. FIG. 18 shows the U-shaped connection 5 and its control points 12, and in addition a connection axis 14, being a straight line between the two connection points 13 at the two ends of the connection 5. FIG. 19 shows a variation direction 15, which in this example is at a right angle to the connection axis 14. Here, as in the other examples and in general, the connection axis 14 and variation direction 15 lie in the plane of the sheet metal strip 1. The variation direction 15 defines the direction in which the control points 12 that are not on the connection axis 14 are displaced according to the deformability parameter. In FIG. 19, the distance of these control points 12 to the connection axis 14 is shown to be proportionally larger than in FIG. 18.

Figure 20:
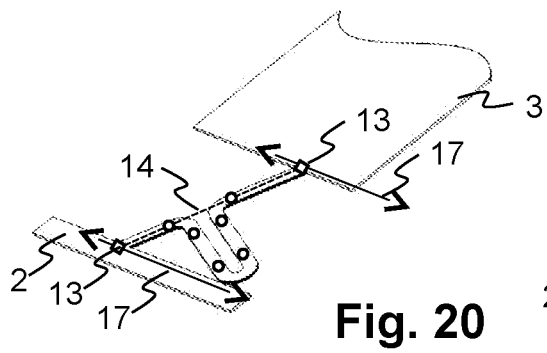

FIG. 20 shows a modification of locations of connection points 13 at which connections 5 are linked to parts 3 or the carrier 2. Each of the connection points 13 can be moved along in an attachment variation direction 17. Typically, this direction is tangential to the side of the carrier 2 or part 3 to which the respective connection point 13 is linked. According to the relative location and distance between the two connection points 13 of the connection 5, the geometry of the connection 5 is rotated and/or scaled. This can be done by rotating and scaling the geometry of the centre curve 11 and the locations of the control points 12, while maintaining the width of the connection 5, as defined by either a constant width or a start and end width. In other embodiments, not illustrated, the connection points 13 are at boundary nodes 6, and the location of the boundary nodes 6 along the carrier 2 or parts 3 is moved in the attachment variation direction 17. In any case, the location of the connection points 13 or the boundary nodes 6 along the carrier 2 or respective part 3 is defined by a corresponding parameter.

Figure 21:
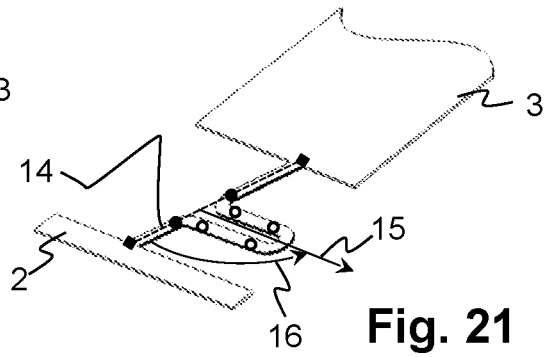

FIG. 21 shows a variation angle 16, being an angle between the connection axis 14 and the variation direction 15. As a default, the variation angle 16 is a right angle, but in this example, in which the connection axis 14 is not the shortest connection between the carrier 2 and the part 3, it can be advantageous to have a different variation angle 16, in order to prevent the connection 5, when it is scaled, to collide with the carrier 2, as it might in the situation of FIG. 20.

Figure 22:
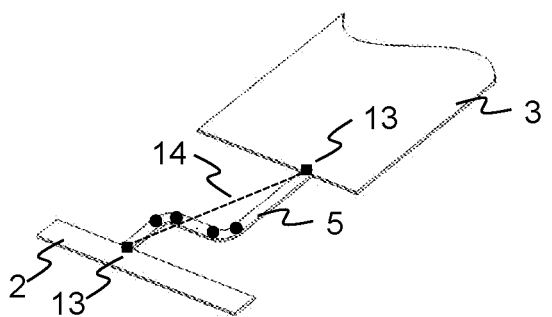
FIGS. 22-29—illustrations of different connections and their scaling by varying a deformability parameter.
Figure 23:
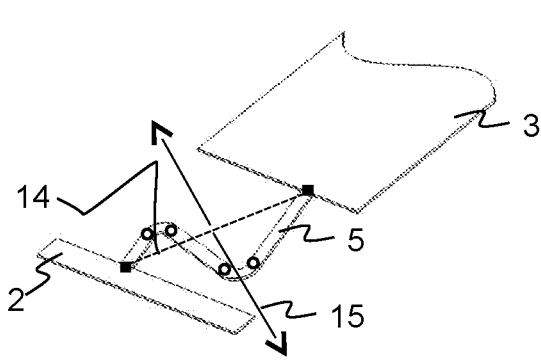

FIG. 22 shows an L-shaped connection 5 with its connection axis 14, and FIG. 23 shows the same connection 5 with its variation direction 15, normal to the connection axis 14, and scaled by modification of the deformability parameter. Again, the distances of the control points 12 from the connection axis 14, in the direction of the variation direction 15, are proportionally changed.

Figure 24:
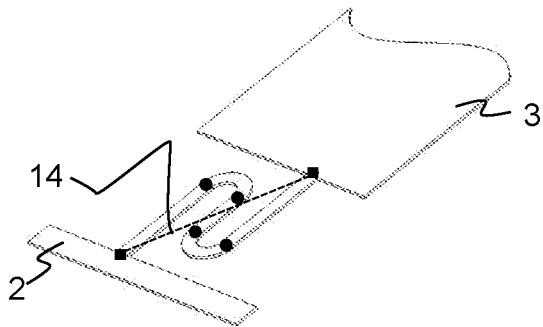
Figure 25:
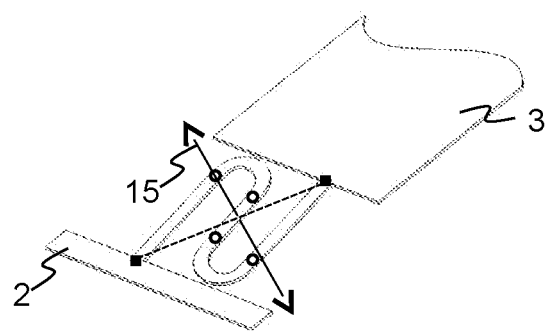

FIG. 24 and FIG. 25 show an S-shaped connection 5 scaled in the same manner.

Figure 26:
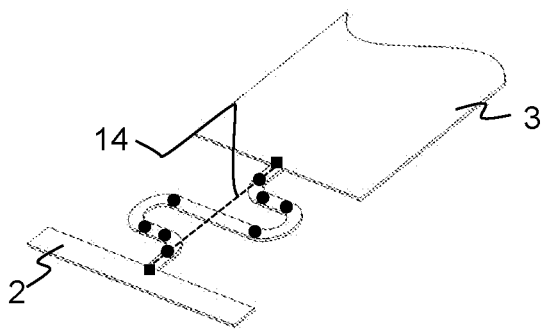
Figure 27:
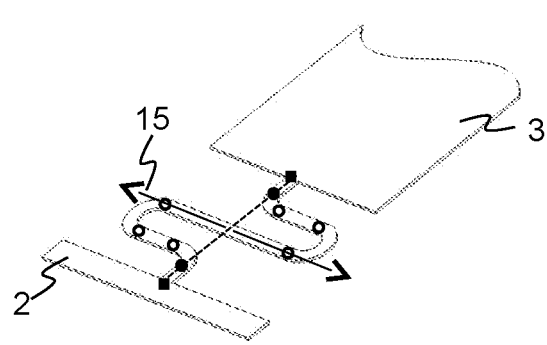

FIG. 26 and FIG. 27 show a double U-shaped connection 5 scaled in the same manner.

Figure 28:
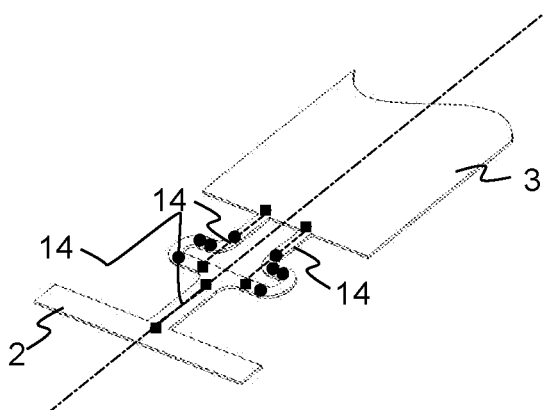
Figure 29:
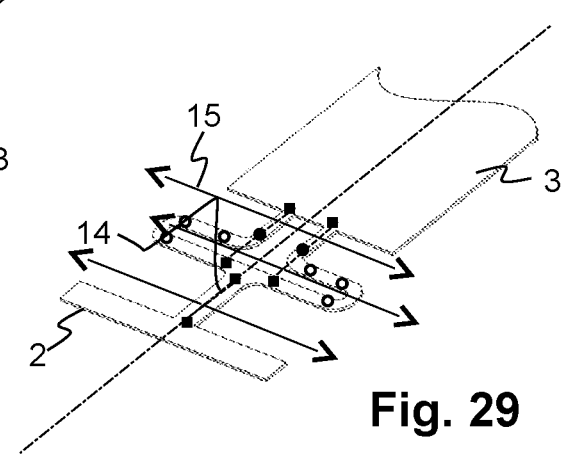

FIG. 28 shows a branched structure with several, in this case, three connections 5. Each connection 5 has its own, separate connection axis 14. The scaling of each connection 5 is done relative to its connection axis 14 and variation direction 15, as shown in FIG. 29. In this example, the connection axes 14 are parallel to one another. In other embodiments, not shown, they can be at an angle to one another. The same holds for the variation directions 15. The scaling of two or more of the different connections 5 can be controlled by separate deformability parameters having different values, or the user interface can be configured for two or more of the separate deformability parameters to be assigned the same value. Setting the deformability parameters of two connections 5, which in this case are symmetric, in a single user interaction allows to control the deformability of this part of the web in an easier manner than having to set the deformability parameter for each connection 5 individually.

FIG. 30 shows a sheet metal strip 1 with parts 3 in different states of processing by progressive stamping or forming. In a first and second step, the part 3 is cut free. In the remaining steps the part 3 is formed, remaining connected to the carrier 2 by the connections 5 forming the webs 4.

FIG. 31 shows a flow diagram for the method with a manual optimisation loop. It comprises the following steps:
20—Start of the procedure.
21—Accepting user input specifying or modifying a web 4 by means of web primitive elements, and generating, based on that input, a geometric computer model of the web 4.
22—Automatically generating, from at least the geometric computer model of the web 4 and from a computer model of the part 3, a combined forming simulation model of the web 4 and part 3.
23—Performing a simulation of the forming process by a progressive die process.
24—Outputting results of the simulation of the forming process.

The procedure can be continued with the first step 21, allowing the user to modify the design of the web 4 in view of the simulation results.

FIG. 32 shows a flow diagram for the method with an automatic optimisation loop. It differs in that in addition or alternatively to the step of outputting results, the following steps are performed:
25—evaluation of the simulation results by means of one or more objective functions.
26—If a result of the evaluation is not satisfactory, perform modifications to parameters specifying the web are done automatically by an optimisation procedure. Parameters in particular are the deformability parameters of the connections 5, and optionally variation angles 16 and further optionally locations of connection points 13 at which connections 5 are linked to parts 3 or the carrier 2, and/or locations of boundary nodes 6 via which connections 5 are linked to parts 3 or the carrier 2.
27—If a result of the evaluation is satisfactory, end of the procedure.

The procedure can be continued with the generation of the forming simulation model, and then iteratively repeated until the results are satisfactory.

Objective functions can relate to properties of the parts 3 and/or the web 4 and/or the production process.

Properties of the parts can be any material or shape properties that are relevant for the finished part. For example, they can comprise stresses and strains in the material of the part, thinning or thickening of the part, springback, and possibly even resulting tearing or wrinkling of the part.

Properties of the web can be its elasticity or, conversely, its stiffness, which via the forces holding the part 3 influences the production process: Depending on the elasticity of the connections 5 and the web 4 as a whole, resulting holding forces exerted by the web 4 on the parts 3 can affect stamping or deep drawing steps. If the parts 3 are tilted during production, the web 4 must accommodate such movements.

Properties of the production process can be the stability of the parts 3 as they are held by the web 4, and/or vibrations or oscillations, which in turn can affect the maximum attainable speed or minimal cycle time of production.

In summary, static properties of the web 4 (for holding the parts 3 in place) and dynamic properties of the web 4 (related to oscillations) can be simulated, and optimised by adapting the parameters of the web, in particular the deformability parameters of the connections 5.

While the invention has been described in present embodiments, it is distinctly understood that the invention is not limited thereto, but may be otherwise variously embodied and practised within the scope of the claims.

The invention claimed is:

1. A computer implemented method for designing a web (4) linking parts (3) to a carrier (2) in a sheet metal strip (1) that is processed in a progressive die process, the parts and the carrier being sheet metal sections of the sheet metal strip, the web comprising links that link the parts to the carrier, and the method comprising the steps of
processing input actions from a user, the input actions specifying parameters of web primitive elements, the web primitive elements comprising at least connections (5), each connection (5) representing a link between sheet metal sections;
the user input actions specifying, for each connection (5), a first connection point (13), at which the connection (5) is joined to a first sheet metal section, and a second connection point (13), at which the connection (5) is joined to a second sheet metal section;

the user input actions specifying a deformability parameter associated with a connection (5), for modifying a spring constant of the connection (5) in a direction between the first and second connection points (13), the spring constant relating forces acting at the first and second connection points in the direction between the first and second connection points to relative displacements of the first and second connection points in the direction between the first and second connection points.

2. The method of claim 1, wherein the deformability parameter affects the shape of connection (5) associated with the deformability parameter along at least a third of the length of the connection, measured along a centre curve of the connection.

3. The method of claim 1, wherein the shape of the connection (5) is represented by a centre curve (11) of the connection (5), the curve (11) having a length, and wherein the deformability parameter modifies the length of the center curve (11).

4. The method of claim 1, wherein the shape of the connection (5) is represented by a centre curve (11) of the connection (5), and the centre curve (1), at least in some sections of the connection (5), deviates from a connection axis (14), the connection axis (14) being a straight line between the first and second connection points (13), and the deformability parameter modifies, for two or more points of the centre curve (11), a distance between each of the two or more points of the centre curve and the connection axis (14).

5. The method of claim 4, wherein the centre curve (11) is defined by a sequence of control points (12), and the deformability parameter modifies the distance of two or more of the control points (12), called "affected control points", from the connection axis (14).

6. The method of claim 5, wherein the affected control points (12) are all the control points (12) that do not lie on the connection axis (14).

7. The method of claim 5, wherein a change of the deformability parameter causes, for each affected control point (12), a change of the control point's (12) distance from the connection axis (14) according to a monotonous function.

8. The method of claim 5, wherein a change of the deformability parameter causes a displacement of the affected control points (12) in a variation direction (15), the variation direction (15) being the same for all the affected control points (12).

9. The method of claim 8 wherein the variation direction (15) lies at an angle, called "variation angle", to the connection axis (14), and wherein the variation angle (16) is controllable by a user input.

10. The method of claim 5, wherein a change of the deformability parameter causes, for each affected control point, a change of the control point's distance from the connection axis, wherein the change of the control point's distance from the connection axis is proportional to the change of the deformability parameter.

11. The method of claim 1, wherein the web primitive elements specified by the user comprise in addition to connections (5), at least one or more of
boundary nodes (6), which are configured to be joined, at one side, to a part (3) or to the carrier (2), and to be joined at another side to a connection (5);
island nodes (7), which are configured to be joined only to connections (5);
cut-outs (8), which are configured to be placed in the carrier (2) or in island nodes (7), representing holes.

12. The method of claim 11, comprising the steps of processing a user input specifying a value for a deformability parameter, and automatically setting the deformability parameters of two or more connections (5) to the value for the deformability parameter specified by the user, wherein the two or more connections (5) are part of the web (4) that links one part (3) to the carrier (2).

13. The method of claim 11, wherein the boundary nodes are configured to be joined, at one side, to a part or to the carrier, and to be joined at an opposite side to a connection.

14. The method of claim 11, wherein the island nodes are configured to be joined to at least three connections.

15. The method of claim 1, comprising the steps of
a) automatically generating, based at least on the web primitive elements specified by the user and on a model of the part (3), a simulation model of the combined web (4) and part (3);
b) simulating, by means of a forming process simulation, a sequence of forming processes for forming the parts (3), thereby also simulating forces and displacements acting on the web (4);
c) determining values of one of more objective functions based on results of the forming process simulation;
d) manually or automatically adapting one or more deformability parameters according to the values of the one or more objective functions;
e) iteratively repeating the above steps a) through d).

16. The method of claim 15, comprising the steps of, in step d), in addition or alternatively to adapting deformability parameters, adapting at least one of
locations of connection points (13) at which connections (5) are linked to parts (3) or the carrier (2), and
locations of boundary nodes (6) via which connections (5) are linked to parts (3) or the carrier (2).

17. A data processing system for designing a web (4) linking parts (3) to a carrier (2) in a sheet metal strip (1) that is processed in a progressive die process, the parts and the carrier being sheet metal sections of the sheet metal strip, the web comprising links that link the parts to the carrier, said data processing system being programmed to perform the steps of
processing input actions from a user, the input actions specifying parameters of web primitive elements, the web primitive elements comprising at least connections, each connection representing a link between sheet metal sections;
the user input actions specifying, for each connection, a first connection point, at which the connection is joined to a first sheet metal section, and a second connection point, at which the connection is joined to a second sheet metal section;
the user input actions specifying a deformability parameter associated with a connection, for modifying a spring constant of the connection in a direction between the first and second connection points, the spring constant relating forces acting at the first and second connection points in the direction between the first and second connection points to relative displacements of the first and second connection points in the direction between the first and second connection points.

18. A computer program for designing a web (4) linking parts (3) to a carrier (2) in a sheet metal strip (1) that is processed in a progressive die process, the parts and the carrier being sheet metal sections of the sheet metal strip, the web comprising links that link the parts to the carrier, the computer program being loadable and executable on a data processing unit and which computer program, when being executed performs the steps of processing input actions from a user, the input actions specifying parameters of web primitive elements, the web primitive elements comprising at least connections, each connection representing a link between sheet metal sections;

the user input actions specifying, for each connection, a first connection point, at which the connection is joined to a first sheet metal section, and a second connection point, at which the connection is joined to a second sheet metal section;

the user input actions specifying a deformability parameter associated with a connection, for modifying a spring constant of the connection in a direction between the first and second connection points, the spring constant relating forces acting at the first and second connection points in the direction between the first and second connection points to relative displacements of the first and second connection points in the direction between the first and second connection points.

19. A non-transitory computer readable medium comprising computer readable program code encoding a computer program that, when loaded and executed on a computer, causes the computer to perform a method for designing a web linking parts to a carrier in a sheet metal strip that is processed in a progressive die process, the parts and the carrier being sheet metal sections of the sheet metal strip, the web comprising links that link the parts to the carrier, and the method comprising the steps of processing input actions from a user, the input actions specifying parameters of web primitive elements, the web primitive elements comprising at least connections, each connection representing a link between sheet metal sections;

the user input actions specifying, for each connection, a first connection point, at which the connection is joined to a first sheet metal section, and a second connection point, at which the connection is joined to a second sheet metal section;

the user input actions specifying a deformability parameter associated with a connection, for modifying a spring constant of the connection in a direction between the first and second connection points, the spring constant relating forces acting at the first and second connection points in the direction between the first and second connection points to relative displacements of the first and second connection points in the direction between the first and second connection points.

20. A method of manufacturing a non-transitory computer readable medium, comprising the step of storing, on the computer readable medium, computer-executable instructions which when executed by a processor of a computing system, cause the computing system to perform a method for designing a web linking parts to a carrier in a sheet metal strip that is processed in a progressive die process, the parts and the carrier being sheet metal sections of the sheet metal strip, the web comprising links that link the parts to the carrier, and the method for designing the web comprising the steps of processing input actions from a user, the input actions specifying parameters of web primitive elements, the web primitive elements comprising at least connections, each connection representing a link between sheet metal sections;

the user input actions specifying, for each connection, a first connection point, at which the connection is joined to a first sheet metal section, and a second connection point, at which the connection is joined to a second sheet metal section;

the user input actions specifying a deformability parameter associated with a connection, for modifying a spring constant of the connection in a direction between the first and second connection points, the spring constant relating forces acting at the first and second connection points in the direction between the first and second connection points to relative displacements of the first and second connection points in the direction between the first and second connection points.

\* \* \* \* \*